Figure 17:
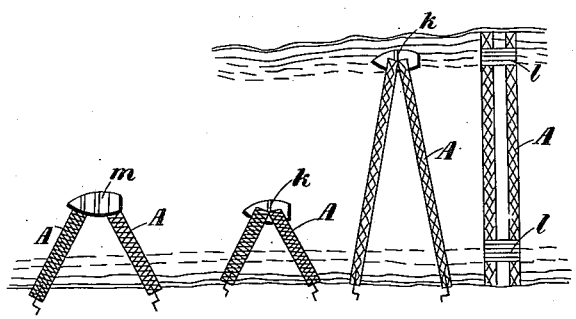

(No Model.) 8 Sheets—Sheet 1.
G. EDWARDS.
EXPANDING AND CONTRACTING BRIDGE.
No. 430,935. Patented June 24, 1890.
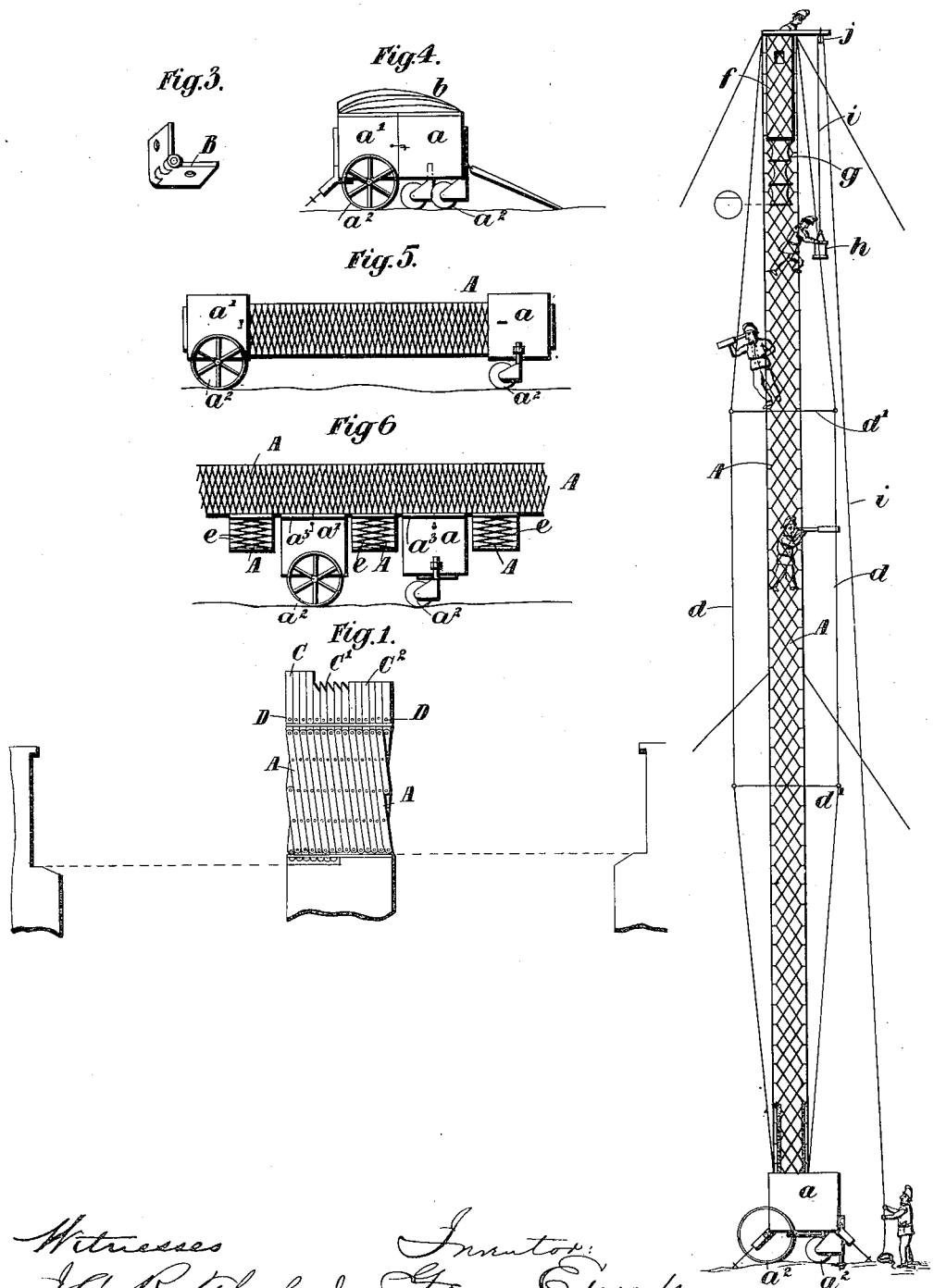

(No Model.) 8 Sheets—Sheet 2.
G. EDWARDS.
EXPANDING AND CONTRACTING BRIDGE.
No. 430,935. Patented June 24, 1890.
Fig. 18.
Fig. 19.
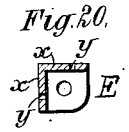
Fig. 20.
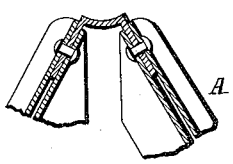
Fig. 21.
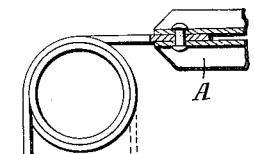
Fig. 22.
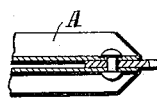
Fig. 25.
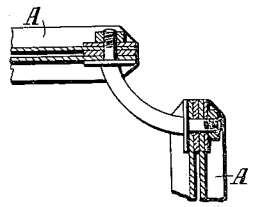
Fig. 23.
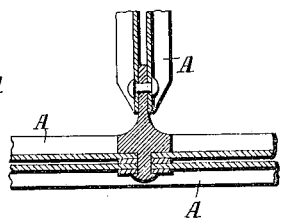
Fig. 24.
Fig. 27.
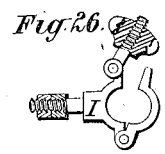
Fig. 26.
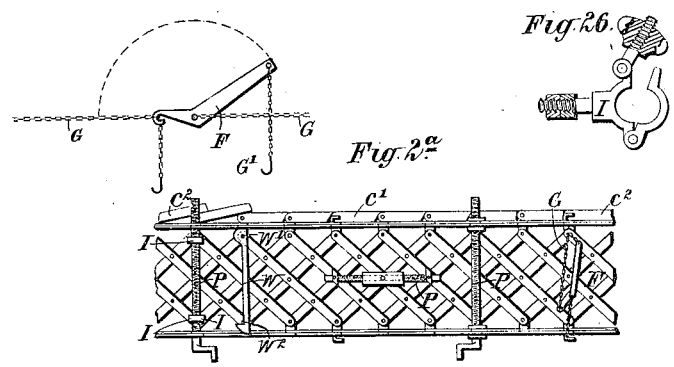
Fig. 2ª.
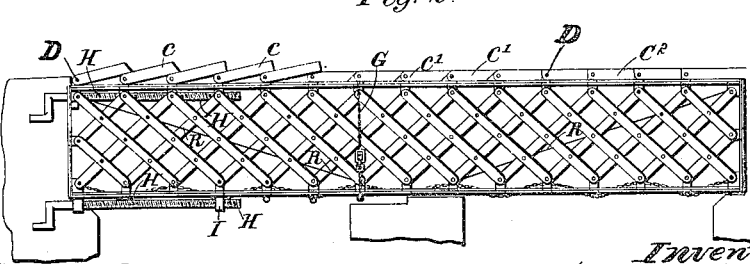
Fig. 2.
Witnesses.  
Inventor  
George Edwards.  
By James L. Norris  
Atty.

(No Model.)
G. EDWARDS.
EXPANDING AND CONTRACTING BRIDGE.
No. 430,935. Patented June 24, 1890.
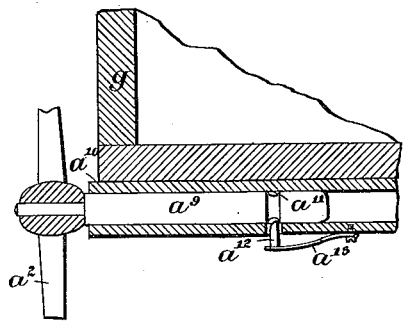
Fig. 4ᵃ
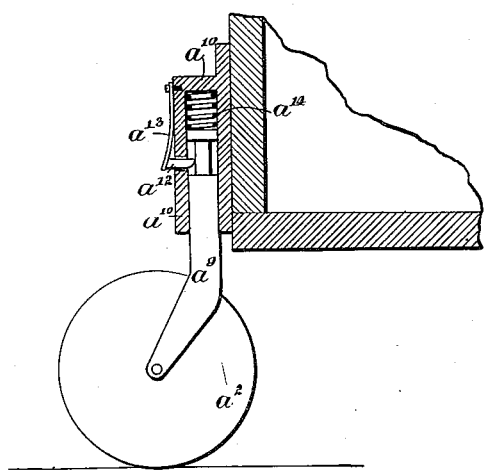
Fig. 4ᵇ
Witnesses.
Percy B. Hills.
Robert Everett.
Inventor
George Edwards,
By James L. Norris.
Atty (No Model.) 8 Sheets—Sheet 4.
G. EDWARDS.
EXPANDING AND CONTRACTING BRIDGE.
No. 430,935. Patented June 24, 1890.

Witnesses:
J. A. Rutherford
Dennis Sumby

Inventor:
George Edwards
By James L. Norris.
Attorney.

(No Model.) 8 Sheets—Sheet 5.

G. EDWARDS.
EXPANDING AND CONTRACTING BRIDGE.

No. 430,935. Patented June 24, 1890.

Witnesses:
J. A. Rutherford
Dennis Sumby

Inventor:
George Edwards
By James L. Norris
Attorney.

(No Model.) 8 Sheets—Sheet 7.

G. EDWARDS.
EXPANDING AND CONTRACTING BRIDGE.

No. 430,935. Patented June 24, 1890.

(No Model.)  8 Sheets—Sheet 8.
G. EDWARDS.
EXPANDING AND CONTRACTING BRIDGE.
No. 430,935. Patented June 24, 1890.
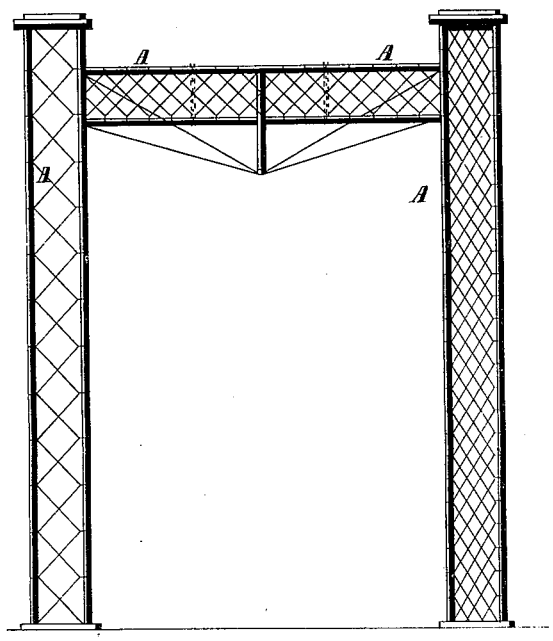

UNITED STATES PATENT OFFICE.

GEORGE EDWARDS, OF LONDON, ENGLAND.

EXPANDING AND CONTRACTING BRIDGE.

SPECIFICATION forming part of Letters Patent No. 430,935, dated June 24, 1890.

Application filed June 20, 1889. Serial No. 314,953. (No model.) Patented in England June 11, 1887, No. 8,398; in Belgium June 15, 1888, No. 82,029; in France July 16, 1888, No. 190,497; in Italy July 19, 1888, and in Austria-Hungary October 12, 1888.

*To all whom it may concern:*

Be it known that I, GEORGE EDWARDS, engineer, a subject of the Queen of Great Britain, and a resident of London, England, have invented certain new and useful Improvements in Expanding and Contracting Bridges and other Structures, (for which I have obtained patents in the following countries: Great Britain, No. 8,398, dated June 11, 1887; France, No. 190,497, dated July 16, 1888; Belgium, No. 82,029, dated June 15, 1888; Austria-Hungary, dated October 12, 1888, and Italy, dated July 19, 1888, which invention is included in my Letters Patent of the United States No. 415,667, issued November 19, 1889,) of which invention the following is a specification, reference being had to the accompanying drawings.

My invention relates to structures mainly composed of expanding and contracting lattices or lazy-tongs, combined in such a manner as to give the structure great strength and rigidity. It also relates to devices for use in connection with the said structures.

My improved structures are useful as bridges, pontons, piers, and landing or embarking stages, and in some instances are also adapted for use as observatories, lookout-towers or signal-stations, and scaffolding.

The said structures are arranged to be expanded and contracted by means of screws, ropes, chains, or pneumatic or hydraulic apparatus separately or combined, and when expanded are stiffened or made rigid by struts, sprags, ropes, chains, levers, or other suitable means. The said structures are mounted on wheels or carriages or on trestles or platforms without wheels, or they may be employed without such appendages.

In the accompanying drawings I have shown how my said invention may be conveniently and advantageously carried into practice.

Figure 9:
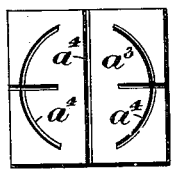
Figure 10:
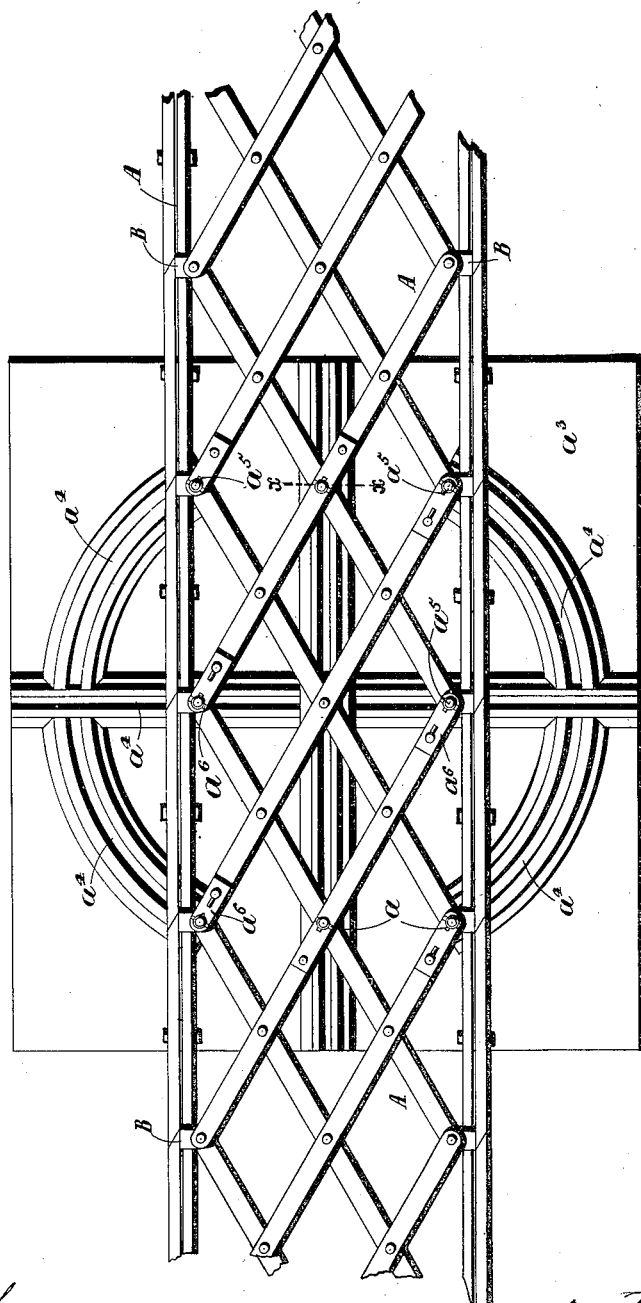
Figure 11:
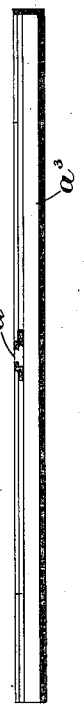
Figure 12:
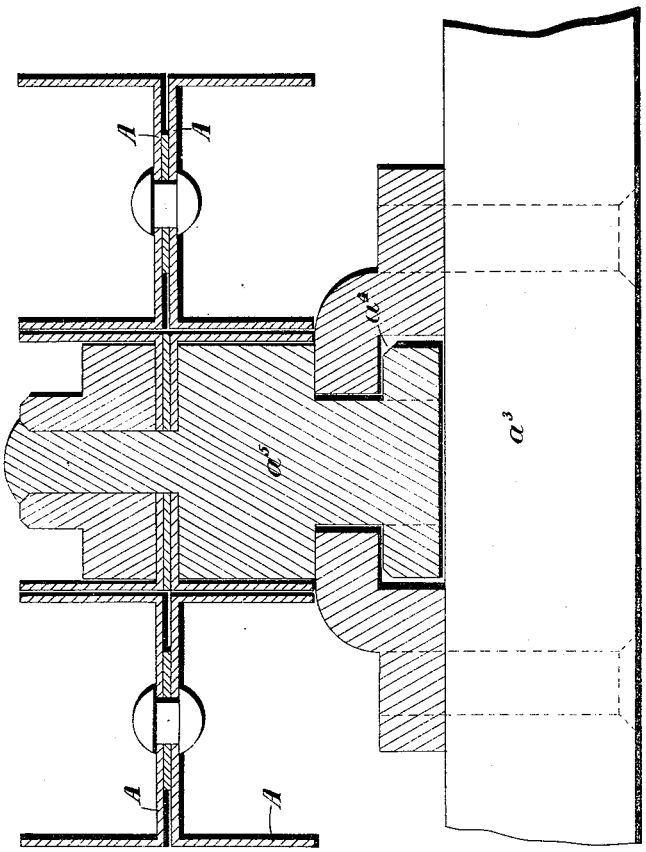
Figure 13:
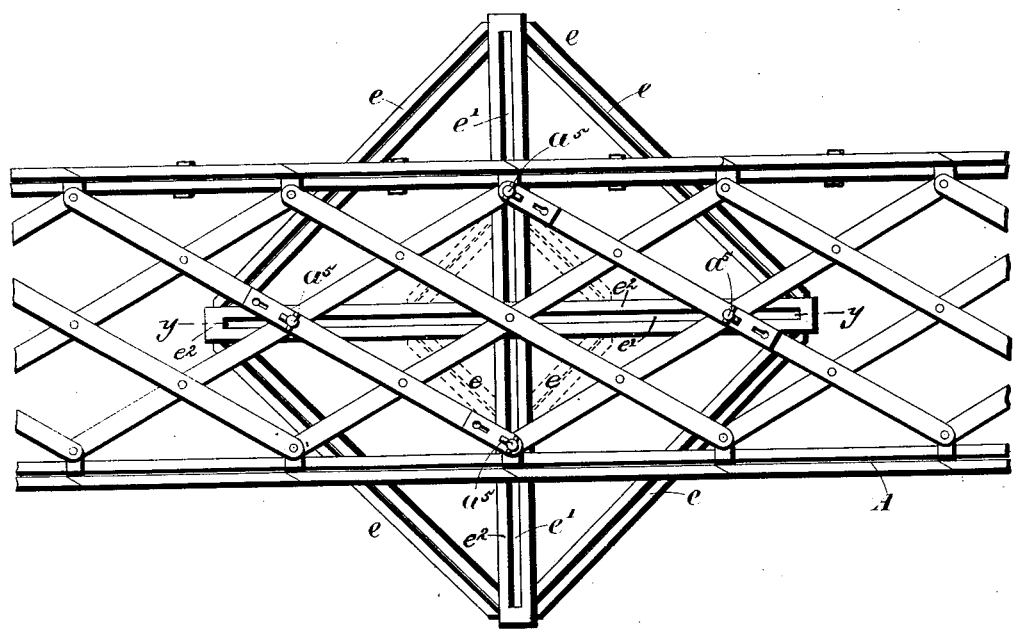
Figure 14:
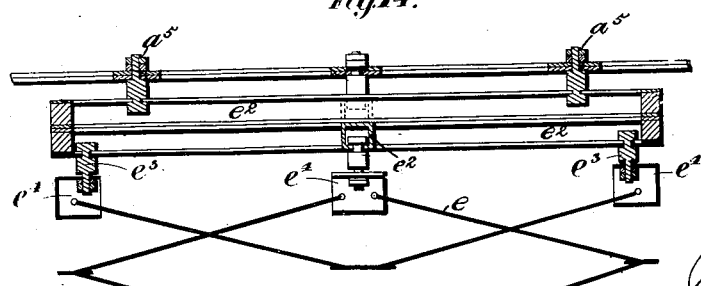

Figure 1 is a side elevation of an expanding and contracting bridge, showing the same contracted or collapsed. Fig. 2 is a side elevation showing the said bridge expanded, with devices for expanding and stiffening the same; Fig. 2ª, a similar view showing other stiffening devices. Fig. 3 is a perspective view showing an improved corner-plate or connecting device hereinafter described. Fig. 4 is a side elevation of a box-wagon or boat-box for inclosing, transporting, and floating or supporting the expanding and contracting structure. Fig. 4ª is a detail sectional view showing means for enabling the wheels of the box-wagon to be removed and secured upon another part thereof. Fig. 4ᵇ is a detail sectional view of a similar device for use in certain cases. Figs. 5 to 8 are side elevations illustrating the method of employing the said apparatus as a ponton or other bridge. Fig. 9 is a plan of a boat-box lid or cover hereinafter described. Fig. 10 is a plan, and Fig. 11 is a side elevation, both drawn to an enlarged scale. Fig. 12 is a detail vertical central section drawn to a still further enlarged scale and taken on the line $x\,x$, Fig. 10. Fig. 13 is a plan, and Fig. 14 is a vertical central section on the line $y\,y$, Fig. 13, drawn to the same scale as Figs. 10 and 11, showing details of construction hereinafter described. Fig. 15 is a side elevation showing the said apparatus adapted for use as a tower intended for a military or other observatory, signal-station, lookout, or the like. Fig. 16 is a front elevation showing my improved structure adapted for use as a scaffolding. Fig. 17 is a plan showing my improved structure adapted for use as a bridge-pier, landing-stage, or the like, and also as a boat-launching apparatus. Figs. 18 to 20 show various forms of corner-plates hereinafter described. Figs. 21 to 25 show various modifications of the said corner-plates in sectional elevation. Fig. 26 shows an improved clip, and Fig. 27 shows a tightening-lever hereinafter referred to.

The lattices or lazy-tongs are formed of slats or strips A, as shown more clearly in Fig. 12, made wholly of wood or metal, or of wood partly or wholly covered or combined with metal or of other suitable material. The said slats or lattice-bars may be of any convenient form in transverse section. I prefer, however, to make them of channeled iron or steel. The said expanding and contracting lattices or lazy-tongs are made by bolting, riveting, or otherwise suitably joining together any required number of these slats or bars A. The improved expanding apparatus intended to form the bridge is made by combining two or more of such lattices or lazy-tongs at any suitable angle to each other and uniting them at the edges or corners of the structure in such a manner that while the said lattices or lazy-tongs are free to expand and contract they are firmly held or retained at the proper angle to each other. Two or more lattices thus united and forming structures resembling in cross-section the letters L V T H—a cross, a triangle, a square, a hexagon, or any suitable form—become rigid and capable of resisting lateral stresses and bearing weight to, at, or from a considerable height or distance.

Figs. 18 to 20 show rigid and hinged corner plates or connectors for connecting or uniting the sides of the apparatus. These plates are connected to the slats by rivets or bolts, as shown in Figs. 21 to 25, so that the lattices or lazy-tongs are free to expand and contract. These corner-plates are situated at the points of contact between two lattices, the latter being connected, as shown, at any suitable angle to each other. In some instances, when the said lattices or lazy-tongs are intended to be folded up, so that they may occupy less space, I employ hinged corner plates or connectors B, Fig. 3. When two lattices are joined together by means of my improved corner plates or connectors and rivets or bolts at any angle, thus L, they become rigid and not easily deflected when expanded, providing some part of the lattice be locked or prevented from moving upon the rivets or bolts. When three lattices are joined, thus U or thus △, they become still more rigid and are useful for certain purposes; but for general purposes I prefer to use four lattices or lazy-tongs, forming a structure which is square or oblong in transverse section.

The expanding bridge is provided with any kind of flooring or planking on the top outside or on the bottom inside. In some instances I provide flooring attached to and forming part of the bridge, as in Figs. 1 and 2. This planking or flooring consists of floor plates or flaps C C' C², of wood, steel, or other suitable material, flat, corrugated, or buckled, and fastened to the lattice by a single hinge-joint D, connecting the center of each flap to the center of the corresponding lattice-work, or by means of one or three joints D, the joint-pin extending through brackets on the lattice, in which it is free to slide when the structure is expanded or contracted, or in any other convenient manner that permits the expansion and contraction of the structure. Three varieties of these floor plates or flaps are shown. The floor plates or flaps C are adapted to serve with variable elongations or expansions of the bridge, the flaps being long enough to lie upon or overlap one another at the extreme elongation, so that when the bridge is contracted they will return automatically to a vertical position, as shown in Fig. 1. In like manner the floor plates or flaps C' are automatic and capable of use with variable expansion, as shown. The floor is close-jointed and flush, and if the bridge were more elongated the flaps would still be flush, but open-jointed, and if the bridge were contracted one flap would rise upon the other by reason of their beveled edges and take the position shown in Fig. 1 or an intermediate position. In certain cases I construct the floor with plates or flaps C², which form butt-joints, thus adding to the stability of the structure. This construction, however, does not permit of the flaps rising over one another, and the contraction of the bridge cannot be so readily effected.

Figs. 4 to 8 show a box-wagon intended to contain the expanding apparatus when closed or contracted. $a\ a'$ indicate the two parts of this box-wagon, which is provided with wheels $a^2$, and sometimes has placed upon it a collapsible or other boat $b$. The bridge, when expanded, is carried upon the parts $a\ a'$ of the box-wagon, which float upon the water, the said parts being turned so that their open side is uppermost, and the wheels $a^2$ being taken off one side of the box and secured to another side thereof. The said wheels $a^2$ are secured to the wagon in the manner shown in Figs. 4$^a$ and 4$^b$—that is to say, each of the larger wheels is secured upon an axle or shaft $a^9$, which is adapted to enter a tubular portion or socket $a^{10}$, which may be secured to the body of the box or wagon $a$ or carried by suitable springs secured thereto. An annular groove or recess $a^{11}$ is formed around the said shaft $a^9$, into which a catch or stud $a^{12}$, which passes through a suitable hole or opening in the socket $a^{10}$, is adapted to enter. This catch or stud is acted upon by a spring $a^{13}$ or other equivalent device, which tends to constantly press it into the interior of the socket $a^{10}$. The said stud is beveled at one extremity, as shown, so that on the axle $a^9$, the end of which is preferably also beveled, being inserted into the said socket the catch $a^{12}$ will be forced back until the annular groove $a^{11}$ comes opposite the same, when it will enter the said groove and prevent the removal of the axle until it is drawn back and disengaged by hand from the outside.

The device shown in Fig. 4$^b$ is intended more especially for use in connection with the smaller wheels of the box-wagon, similar letters referring to similar parts. In this case the wheel $a^2$ is carried in the forked extremity of a non-revolving shaft $a^9$, while the socket $a^{10}$ is placed vertically, a spring 14 being provided therein, which presses upon the extremity of the shaft $a^9$ and allows of a certain amount of up-and-down motion, thus serving to counteract to a certain extent the effect of inequality of the road. To allow of this up-and-down motion, the length of the annular ring or groove $a^{11}$ is considerably increased, thus preventing the interference of the stud or catch $a^{12}$. Two or more of the sockets $a^{10}$ are provided upon different parts of the wagon, according to the positions in which it is desired to place the wheels, so that by drawing back the stud $a^{12}$ the shaft $a^9$ can be withdrawn from one of the said sockets and inserted in another.

It is obvious that other devices may in certain cases be employed to secure the axle in its place, while permitting of the ready removal of the same—such, for instance, as hinged straps adapted to clasp around the same; but I prefer to employ the arrangements described above. The parts $a$ $a'$ of the wagon, when made water-tight, serve as boats or buoys to float the apparatus as a bridge or ponton upon water.

Figure 7:
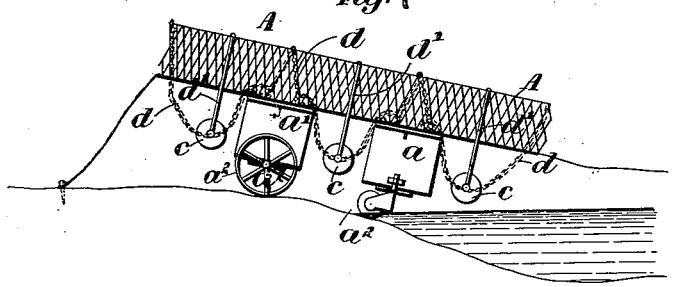

For use as a bridge the apparatus is partly expanded, as shown in Fig. 5, and the parts $a$ $a'$ of the box-wagon are then placed in the position shown in Fig. 6 and fastened to the apparatus as hereinafter described or in any other convenient manner. The whole apparatus is then taken to the water and launched, as shown in Fig. 7, and pulled or stretched across the river by further expanding it by means of ropes or chains, and is moored to land as a bridge, Fig. 8; or it may be expanded to its full length before it is launched. Air-bags $c$, Figs. 7 and 8, or other floats, rafts, or boats may be used in aid of or instead of my improved box-wagon boats or buoys. The wheels $a^2$ under my improved box-boats serve to transport the apparatus on land and in water until it floats on the water. In some cases I provide each of the parts $a$ $a'$ with a lid or cover $a^3$, (more clearly shown in Figs. 10 to 12,) with or without water-tight packing, so that they may be submerged without the risk of their filling with water. In the lid or cover $a^3$ are formed grooves or slots $a^4$, in which studs $a^5$, Fig. 12, fastened to suitable joints on the lattices, are arranged to slide. The lid or cover $a^3$ is secured to the box by any suitable means, and the heads of the said studs $a^5$ are placed in the said grooves or slots $a^4$. The said studs $a^5$ slide in the grooves or slots $a^4$ when the lattices or lazy-tongs are expanded or contracted. The opposite ends of the studs $a^5$ may pass through slotted plates $a^6$; but, as I do not confine myself to any particular means for holding the studs in engagement with the lattices or lazy-tongs, further explanation is not deemed necessary. The bridge is thereby fastened to the box-boat in such a manner that it may be expanded or contracted, or the bridge and boxes or boats may be joined by other suitable means. The bridge may be used and transported in or on any other suitable form of wagon or carriage.

Figure 8:
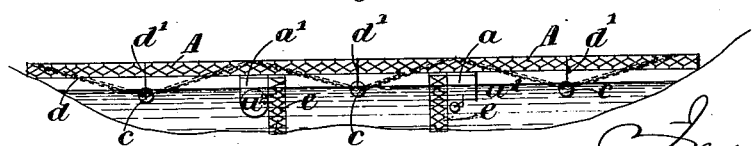

$d$ $d$ are rope or chain ties which are sometimes applied to the apparatus, so that when the latter is expanded to the required length they will be tightly stretched. I sometimes, moreover, employ screw or other struts $d'$, or girdles, props, and other strengtheners or stiffeners, affixed according to the strain it is required to resist. In certain cases the stiffening ties, ropes, or chains $d$ and struts $d'$ may be placed upon the apparatus before it is launched, as shown in Fig. 7, and when the bridge is expanded across the river they may be tightened either automatically or otherwise, as shown in Fig. 8.

Various forms of devices or apparatus are shown in Figs. 2 and 2ª for expanding and stiffening or sustaining the bridge or other structure.

R R are ropes used as trusses for stiffening and strengthening the structure. These trusses may be used on one or more sides of the said structure.

W is a latch-stiffener arranged to lock automatically. This latch may be arranged vertically or horizontally. It is pivoted at W' and adapted to engage with a pin or stud $W^2$. I prefer to employ screws H H for expanding the structure, which screws are usually arranged to be rotated by means of suitable crank-handles with or without intermediate gearing. These screws and the tightening-screws P are held in improved clips I, Fig. 26, which are secured to the structure by rivets or nuts. The improved clip consists of a hinged nut or collar, by means of which the screws H H or P, Figs. 2 and 2ª, may easily be attached to and detached from their nuts and bearings. These bearings and nuts are sometimes, however, made in one piece or in two parts, bolted together like an ordinary plumber-block.

G is a chain girdle, which surrounds the tower for the purpose of stiffening the same.

F is a lever-coupling hook (shown in an enlarged view in Fig. 27) for joining and tightening chain and rope girdles, stiffeners, and trusses by moving the lever, as indicated by the dotted line in Fig. 27. The chain G is tightened and may be kept so by the chain G' or other similar means.

Either form of stiffening and strengthening devices may be used.

I sometimes use props of wood or other suitable material as supports resting upon or driven into the river-bed, and in other cases I support my bridges with or upon expanding lattice-piers $e$, as shown in Figs. 6 and 8. The expanding lattice-piers $e$ are formed of slats or strips A in a similar manner to the expanding apparatus forming the bridge. The said expanding lattice-piers may also be used for supporting other bridges or for facilitating the making or repair of a bridge. Fig. 6 shows these supporting-piers $e$ attached to the bridge before the same is launched. When the bridge is in place, they are allowed to expand by their weight until they rest on the bed of the river, and are then stiffened or made rigid by any of the hereinbefore-mentioned devices or by other suitable means. They are shown in Figs 6 and 8, for convenience, attached square with or at right angles to the bridge; but they are preferably arranged diagonally thereto, as shown in Figs. 13 and 14. The said expanding and supporting piers e are attached to the bridge by means of slotted or grooved bars and studs in such a manner as to permit the expansion and contraction of both bridge and pier, as more clearly shown in Figs. 13 and 14. The bottom lattice of the bridge is provided at the joints with studs $a^5$, similar to those hereinbefore described, and adapted to slide in grooves $e'$, provided in intermediate pieces $e^2$, as the lattice is expanded or contracted. In Fig. 13 the pier $e$ is shown in full lines in the position it assumes when in a contracted position and in dotted lines in the position it assumes when in an expanded position.

The pier $e$ is attached to the intermediate piece $e^2$ by means of studs $e^3$ and webbed corner-plates $e^4$, to which the terminal slats of the pier $e$ are fastened by means of rivets, bolts, or in any other suitable manner.

E, Fig. 20, is a terminal or webbed corner plate or connector for connecting or joining lengths or sections of the structure together. These connectors are secured by rivets or bolts or otherwise to the ends of the said lengths or sections and facilitate the junction of the same by means of suitable bolts passed through the holes $y$ in the webs $x$ of the said connectors.

Fig. 15 shows the expanding apparatus placed in a vertical position for use as an observatory or for other purposes. In this case the part $a'$ of the wagon is removed, and the apparatus is raised on end, expanded, and kept expanded and rigid by any of the expanding, tightening, or stiffening devices hereinbefore mentioned. In the upper extremity is inserted a cylinder $f$, which may, if desired, be bullet-proof, and which has combined therewith a masked ladder $g$, a portion only of which is shown in the drawings. The said ladder $g$ extends from the top to the bottom of the apparatus. Communication between persons below and those on or in the structure may be made by means of a dispatch-bag $h$, attached to a rope $i$, passing over a grooved wheel or pulley $j$, or by telegraph, telephone, speaking-tube, signals, or other suitable means.

Fig. 16 shows the expanding apparatus arranged so as to form a scaffolding.

Fig. 17 illustrates an arrangement in which two or more of the hereinbefore-described expanding structures are employed. One end of each of the said structures is supported at $k$ on my improved box-boat or upon any other boat, float, or raft in the water, the other end being supported on the land. The two expanding structures are then pushed out or expanded by means of screws or other expanders to the opposite side of the river. They are then placed parallel as girders, and may be propped, supported, stiffened, and planked, as shown at $l$, to form a bridge.

In like manner a life or other boat $m$ may be launched, the boat being supported upon, however, instead of supporting, the towers or girders, which are carried upon their own wheels and forced out till the boat floats and is released from them.

What I claim is—

1. A structure of rectangular form in transverse section for use as a ponton, bridge, or pier, or for similar purposes, and consisting of expanding and contracting lattices or lazy-tongs united at the corners by means of angle-plates fitting between the bars or slats of the corresponding lattices or lazy-tongs and secured thereto by rivets or bolts, substantially as and for the purposes set forth.

2. A rectangular structure consisting of expanding and contracting lattices or lazy-tongs composed of trough-shaped or channeled bars or slats, and united at the corners by means of angle-plates fitting between the bars or slats of the corresponding lattices or lazy-tongs and secured thereto by rivets or bolts, substantially as and for the purposes set forth.

3. In combination with a structure composed of expanding and contracting lattices or lazy-tongs united at the corners or edges, as above described, a box-wagon $a\ a'$, capable of being tightly closed, and provided with means, substantially such as above described, for securing the said structure thereto, substantially as and for the purpose set forth.

4. The combination, with a structure composed of expanding and contracting lattices or lazy-tongs united at the corners or edges, as above described, of expanding and contracting piers or supports $e$, provided with means, substantially such as above described, for securing the said structure thereto, substantially as and for the purpose set forth.

5. A structure composed of expanding and contracting lattices or lazy-tongs united at the corners or edges by means of hinged corner-plates B, substantially as and for the purposes set forth.

6. The combination, with a structure composed of expanding and contracting lattices or lazy-tongs united at the corners or edges, as above described, of strips, plates, or flaps hinged or pivoted to the said structure and capable of rising and falling as the structure is contracted and expanded for the purpose of forming a floor or roadway when the said structure is used as a bridge or the like, substantially as and for the purposes set forth.

In testimony whereof I have hereunto signed my name in the presence of two subscribing witnesses.

GEORGE EDWARDS.

Witnesses:
 DAVID YOUNG,
 CHAS. E. GREENFIELD.